3,409,495
LAMINATED THERMOPLASTIC
SHEET MATERIAL
Ole-Bendt Rasmussen, Copenhagen, Denmark, assignor to Phillips Petroleum Company, a corporation of Delaware
No Drawing. Filed Feb. 25, 1964, Ser. No. 347,114
Claims priority, application Great Britain, Mar. 2, 1963, 8,429/63
9 Claims. (Cl. 161—55)

ABSTRACT OF THE DISCLOSURE

A tear resistant plastic laminate is disclosed and a method of making the same, including mixing a minor amount of a swellable foreign polymer in a major amount of an orientable polymer, forming the mixture into a film, exposing said film to a solvent so that at least some of the solvent is taken up by said foreign polymer, orienting the film, heating the oriented film to expand the solvent and form small cavities therein, and bonding at least a pair of oriented films together so that their directions of orientation form an angle with each other wherein at least one of said films contains the cavities.

---

This invention relates to a laminated sheet of organic thermoplastic material and to a method of forming same.

In my copending application, Ser. No. 257,669, filed Feb. 11, 1963, now U.S. Patent 3,322,613, I described a laminated sheet formed from organic thermoplastic material, said sheet being highly resistant to tear and tear propagation. This laminate is made up of two, three, or more plies of film which have been highly oriented in one direction, as by cold stretching. Crystalline polymers which are orientable in this manner include nylon, polyethylene terephthalate, polyethylene, polypropylene, polyvinylidene chloride, and the like. The orientation is preferably carried out at a temperature far below the crystalline melting point of the polymer and the films are then bonded together in a laminate so that the directions of orientation of adjacent plies form an angle with one another.

I have described in my U.S. Patent 2,943,356 how to obtain elongated films in which the direction of orientation lies at an angle to the longitudinal direction of the film. Briefly, this is done by longitudinally cold stretching a film of the polymer which has been extruded in a tubular shape and then cutting the stretched tube on a bias. I prefer that the plies of the laminate be bonded together with a pressure-sensitive adhesive. Laminates of this type have improved resistance to tear, more than would be expected from merely the increase in total thickness of the sheet. These laminates also resist further tearing once the structure has been ruptured. I have found that it would be desirable, however, to improve the ability of such laminates to resist tearing when exposed to sudden shocks. It is true of many sheet materials that tear propagation resistance decreases substantially when the tearing occurs very quickly. It is desirable, therefore, to provide a sheet material which has improved resistance to shock-tear propagation.

I have now discovered a laminated sheet which has improved resistance to tear propagation even when subjected to shock. This is provided in a laminate in which at least two plies of uni-axially oriented film of organic thermoplastic material are bonded together so that the directions of orientation of adjacent plies form an angle with each other and at least one of the plies contains a multitude of internal microscopic cavities or cracks which do not penetrate through the ply from one surface to the other. I prefer a laminate in which all of the plies contain such cavities. These plies are formed preferably by dispersing into the polymeric material, either before or after orienting the film, a volatile or gas-forming agent and then vaporizing or expanding this agent or inducing the evolution of gas therefrom after the film has been oriented. The oriented and expanded films are then cross-laminated or in some cases the cross-lamination can take place before inducing the expansion of the films.

I have found that structures of the type described above show a surprising increase in shock-tear propagation resistance. It would normally be expected that forming cavities or cracks in a film structure would decrease the strength thereof, but it has been established that with respect to the oriented cross-laminates this internal cracking or cavitation after orientation improves the shock strength considerably. The laminates of my invention, therefore, have increased utility for making articles such as bags, tarpaulins, and other products where high shock-tear resistance is important.

It is an object of my invention to provide an improved laminated sheet material. Another object is to provide a sheet of organic thermoplastic which has improved resistance to shock-tear propagation. Still another object is to provide a method of making a laminated sheet with improved resistance to tear. Other objects, advantages and features of my invention will be apparent to those skilled in the art from the following discussion.

While I do not wish to be limited in any manner by theory, I believe that the improved strength of the laminates of my invention can be attributed to the fact that the cracks or cavities within the separate plies act as initial points for splitting or necking down of the plastic material during tearing. In other words, each layer tends to split or neck down in accordance with its direction of orientation in such a way that by virtue of these initial points a multitude of splits or small zones for necking down are formed instead of only one. This tends to distribute what would otherwise be a concentrated force action of tearing so that the total structure is better able to resist propagation of any rupture which may form.

Films can be oriented for use in the laminate of this invention by known methods. I prefer to use crystalline polymeric materials such as high density polyethylene and ethylene copolymers or highly crystalline polypropylene, sometimes referred to as isotactic polypropylene. By "high density" I refer to ethylene polymers having a density of at least about 0.94 as determined on an annealed, compression molded specimen. By "highly crystalline" I mean polymers having a crystallinity above about 70 percent as determined on annealed specimens by infrared analysis or nuclear magnetic resonance. Normally films of such polymers can be oriented uni-axially by stretching at temperatures below and preferably at least 70° C. below the crystalline melting point of the polymer. Stretching at room temperature is satisfactory. Once the material has been cold stretched, a slight stretching at a higher temperature can be useful in relieving tensions which otherwise may tend to distort the sheet.

The volatile or gas-forming agent which is used to form the micro-cavities in the film can be incorporated either before or after orientation. The preferred way of forming these cavities is to use a volatile mateial which has substantially no dissolving or swelling action on the polymer that forms the main constituent of the film. Such volatile agents can be incorporated by dispersing into the main polymer, a second polymer which is very foreign to the first, this mixing being carried out before the film is made. The foreign polymer thereby provides sites for swelling when subjected to the action of the volatile agent and upon subsequent heating, the vaporization or expansion of this agent produces the required cavities within the film. The introduction of foreign materials which can be induced to provide pressures within a film is described in my U.S. Patent 2,948,927. In this patent the object is entirely different from the present invention since the pressure-exerting material is used to assist in splitting up the film to form a fibrous or porous material. Such pressure-exerting materials can be used to a limited extent in practicing the present invention provided the cracks or cavities formed do not reach from one side of the film to the other as this would render the material textile-like and unsuitable for protection against water, for instance. This is, however, simply a matter of not carrying out the expansion of the gas-forming agent too vigorously.

An effective way of blending small amounts of foreign polymer into the main polymer is by adding graft or block polymers which serve as links between the two phases, or, in other words, as surface active agents in the polymer blend. As explained previously, high density polyethylene and highly crystalline polypropylene are preferred for use as the main polymer because of their good mechanical properties after stretching at about room temperature, as well as their resistance to swelling. Examples of the foreign polymer which can be incorporated in minor amounts, and preferably in amounts of about 5 to 10 percent of the total blend, include esters of polyacrylic acid such as polymethacrylate, polyethacrylate, polymethyl methacrylate, polyethyl methacrylate, and the like. These are recommended because these monomers are easily reacted with an activated polymer to form graft or block polymers. Also, such polyesters are readily dissolved or strongly swelled in many solvents such as acetone, methyl ethyl ketone, methyl isobutyl ketone, chlorinated hydrocarbons, and the like. These polymers further have high temperature resistance which is desirable during extrusion of the film. Many other polymers such as polyvinyl esters, polyvinyl ethers, polystyrene, polyvinyl chloride, cellulosic polymers, polycarbonates, polyvinyl butyrol, and the like, can also be used. Other suitable foreign polymers will occur to those skilled in the art when it is kept in mind that the foreign polymer must be capable of swelling when exposed to a volatile solvent which does not significantly swell or dissolve the main polymer, which is preferably a 1-olefin polymer. The foreign polymer should also be one which is not totally compatible with the main polymer so that it becomes dispersed in small discrete portions throughout the main polymer which forms the film. Other volatile solvents such as amyl chloride, benzene, chlorobenzene, ethylene chloride, ethyl alcohol, and the like, can be selected to suit the foreign polymer used.

The volatile agent can be incorporated in the film containing the foreign polymer as described above by passing the film through a bath of such agent in liquid or vapor form or otherwise exposing the film to the agent for a period sufficient to permit the foreign polymer to take up some of the volatile agent. The temperature and the duration of such treatment will, of course, vary with the polymers and volatile solvents selected but can readily be determined in each case. The film can be treated with the volatile solvent either before or after orientation. The agent should not be expanded, however, until after the film has been oriented. This can readily be effected by passing the film through a heat zone such as a stream of hot air chamber, a hot water bath, over heated rollers, or by subjecting the film to high frequency radiation. The temperature of this treating should, of course, be substantially below the crystalline melting point of the polymer so that the orientation of the film is not destroyed. The film can also be heated in a vacuum chamber where the pressure is reduced to increase the expansion of the solvent vapor trapped within the polymer.

The plies thus oriented and expanded are bonded together in any known manner such as by adhesives or by welding with solvents or heat. When welding the plies together, it is important that only a thin layer on the surface of each ply is affected. In this regard, the increased thickness of the ply resulting from expansion thereof is an important advantage in carrying out the lamination. Welding can be effected by administering a hot solvent between the surface of the plies immediately before continuously joining them as by passing them between a pair of rollers or, alternatively, a flame or other heat source can be used to melt a thin layer on the surface of the plies before bringing them together to be joined. I prefer that the plies be bonded together by means of a pressure-sensitive adhesive such as a polyisobutylene, polyvinylisobutyl ether, a normally tacky fatty-polyamide, or the like, these polymers exhibiting substantial cold flow, either used alone or with 20 to 30 percent of a microcrystalline wax. As stated above, the expansion of the film can be carried out after the plies have been bonded together to form a laminate.

To describe further my invention, the following example is presented. This example should be construed as typical only and not to limit the invention unduly.

EXAMPLE

Polyethylene having a density of 0.96 gram per cubic centimeter at 20° C. and a melt index of 0.2 (ASTM D1238–52T) is blended with powdered polymethyl methacrylate having a particle size of about 10 microns to form a mixture containing 7 weight percent of the polymethyl methacrylate. The polymer mixture is extruded and blown to form tubing which is then stretched four-fold at room temperature and then cut on a bias so that the direction of orientation forms an angle of 60° with the longitudinal direction of the sheet. Part of the oriented tubing is split lengthwise so that the direction of orientation runs parallel to the longitudinal dimension of the sheet. These films, which have a thickness of approximately 1 mil, are placed in an acetone bath at atmospheric pressure and room temperature for 48 hours. The films are then passed through a steam chamber where they are heated to about 212° F. The expanded films, as withdrawn from the steam chamber, are cooled and bonded together to form a three-ply laminate with an adhesive made from polyvinylisobutyl ether containing 20 percent microcrystalline wax. The adhesive is pressure sensitive and is applied in a layer about 10 microns thick. The plies are associated with the sheet having longitudinal orientation in the center and a sheet having orientation at 60° to the longitudinal dimension positioned on each side so that the directions of orientation of all 3 sheets cross each other. The three-ply laminate thus formed is fabricated into a bag and exhibits excellent resistance to shock-tear propagation.

As will be apparent to those skilled in the art, various modification can be made in my invention without departing from the spirit or scope thereof.

I claim:

1. A laminated sheet having at least two plies of uniaxially oriented film of organic thermoplastic material bonded together so that the directions of orientation of adjacent plies cross, at least one of said plies containing a multitude of interior micro-cavities which do not penetrate through the ply from one surface to the other.

2. A sheet according to claim 1 formed from a high density ethylene polymer.

3. A sheet according to claim 1 formed from highly crystalline polypropylene.

4. A voluminous plastic sheet comprising a plurality of plies of organic thermoplastic material bonded together in a laminate, each ply having a foamed structure characterized by fine internal cavities which do not extend through said ply from one surface to the other and each ply being highly oriented in one direction, the directions of orientation of adjacent plies lying at an angle to one another.

5. A tear-resistant sheet of orientable thermoplastic 1-olefin polymer comprising a laminate of three plies bonded together with pressure-sensitive adhesive, each ply being a uni-axially oriented film of said polymer and containing a multitude of interior, uniformly distributed microscopic cavities which do not penetrate through the film from surface to surface and said plies being associated so that the directions of orientation of adjacent plies form an angle of about 45 to 60 degrees with each other.

6. An elongated sheet according to claim 5 wherein the direction of orientation of the center ply lies parallel to the longitudinal direction of the sheet.

7. A method of making a tear resistant plastic sheet which comprises forming a mixture of a major amount of an orientable 1-olefin polymer and a minor amount of a foreign polymer capable of swelling when exposed to a volatile solvent which does not significantly swell said 1-olefin polymer, shaping said mixture into a film, exposing said film to said solvent so that some of said solvent is taken up by said foreign polymer dispersed throughout said film, orienting said film uni-axially by cold drawing, heating the oriented, solvent-containing film sufficiently to expand said solvent without destroying the orientation thereby producing small cavities within the film, and bonding together in a laminate at least two oriented, cavity-containing films so that the directions of orientation of adjacent films form an angle with each other.

8. A method of making a tear resistant plastic web which comprises forming a mixture of a major amount of a first polymer and a minor amount of a foreign polymer capable of absorption of a volatile solvent which is not significantly absorbed by said first polymer, shaping said mixture into a film, exposing said film into said solvent so that some of said solvent is taken by said foreign polymer dispersed throughout said film, orienting said film uni-axially, heating the oriented, solvent-containing film sufficiently to expand said solvent without destroying the orientation thereby producing small cavities within the film, and bonding together in a laminate at least one oriented, cavity-containing film with a second oriented film so that the directions of orientation of said films form an angle with each other.

9. A method of making a tear resistant plastic sheet which comprises forming a mixture of a major amount of an orientable 1-olefin polymer selected from high density polyethylene, ethylene copolymers and polypropylene and a minor amount of a foreign polymer selected from the esters of polyacrylic acid, shaping said mixture into a film, exposing said film to a solvent capable of swelling said foreign polymer but incapable of significantly swelling said 1-olefin polymer so that some of said solvent is taken up by said foreign polymer dispersed throughout said film, orienting said film uni-axially by cold drawing, and subsequently heating the oriented, solvent-containing film sufficiently to volatilize said solvent without destroying the orientation thereby producing small cavities within the film, and bonding together in a laminate at least two oriented, cavity-containing films so that the directions of orientation of adjacent films form an angle with each other.

References Cited

UNITED STATES PATENTS

| | | | |
|---|---|---|---|
| 2,067,025 | 1/1937 | Schmidt | 161—402 X |
| 2,806,256 | 9/1957 | Smith-Johannsen | 156—77 X |
| 3,003,304 | 10/1961 | Rasmussen | 161—402 X |
| 3,227,664 | 1/1966 | Blades et al. | 264—41 X |
| 2,631,954 | 3/1953 | Bright | 161—402 X |

ROBERT F. BURNETT, *Primary Examiner.*

W. A. POWELL, *Assistant Examiner.*